(12) United States Patent
Yoshimura et al.

(10) Patent No.: US 8,981,019 B2
(45) Date of Patent: Mar. 17, 2015

(54) METHOD FOR PRODUCING METHACRYLIC-BASED POLYMER

(71) Applicant: Mitsubishi Rayon Co., Ltd., Chiyoda-ku (JP)

(72) Inventors: Hisaaki Yoshimura, Toyama (JP); Masahiro Hayashida, Otake (JP); Daisuke Nonaka, Otake (JP); Yusuke Morita, Otake (JP); Mitsuhiro Matsuo, Otake (JP)

(73) Assignee: Mitsubishi Rayon Co., Ltd., Chiyoda-ku (JP)

( * ) Notice: Subject to any disclaimer, the term of this patent is extended or adjusted under 35 U.S.C. 154(b) by 0 days.

(21) Appl. No.: 14/360,759

(22) PCT Filed: Dec. 17, 2012

(86) PCT No.: PCT/JP2012/082629
§ 371 (c)(1),
(2) Date: May 27, 2014

(87) PCT Pub. No.: WO2013/099670
PCT Pub. Date: Jul. 4, 2013

(65) Prior Publication Data
US 2014/0309383 A1 Oct. 16, 2014

(30) Foreign Application Priority Data
Dec. 27, 2011 (JP) ................................. 2011-285714

(51) Int. Cl.
C08F 2/02 (2006.01)
C08F 2/38 (2006.01)
C08F 220/14 (2006.01)
C08F 2/06 (2006.01)
C08F 2/01 (2006.01)
(Continued)

(52) U.S. Cl.
CPC ..... *C08F 2/06* (2013.01); *C08F 2/01* (2013.01); *C08F 2/38* (2013.01); *C08F 220/18* (2013.01); *C08F 6/003* (2013.01); *C08F 4/04* (2013.01); *C08F 4/80* (2013.01); *Y10S 526/917* (2013.01)
USPC ........... 526/65; 526/224; 526/329.5; 526/917

(58) Field of Classification Search
USPC .................................. 526/65, 224, 329.5, 917
See application file for complete search history.

(56) References Cited

U.S. PATENT DOCUMENTS 6,448,354 B1 * 9/2002 Hieda et al. .................... 526/319
6,632,907 B1 10/2003 Mizota et al.
(Continued)

FOREIGN PATENT DOCUMENTS

JP 2000 26507 1/2000
JP 2000 53712 2/2000
(Continued)

OTHER PUBLICATIONS

Machine translation of JP 2004-211105A; publication date: Jul. 29, 2004.*
(Continued)

Primary Examiner — Fred M Teskin
(74) Attorney, Agent, or Firm — Oblon, McClelland, Maier & Neustadt, L.L.P.

(57) ABSTRACT

There is provided a method capable of producing a methacrylic-based polymer excellent in pyrolysis resistance and excellent in fabricability in a high productivity. The method for producing a methacrylic-based polymer includes the following steps (1) and (2): step (1) of using a complete mixing reactor (A) to thereby obtain the first syrup, including specific steps; step (2) of using a reaction apparatus (D) including a plug flow mixer (B) and a plug flow reactor (C) to thereby obtain the second syrup, including specific steps.

5 Claims, 1 Drawing Sheet

(51) Int. Cl.
*C08F 220/18* (2006.01)
*C08F 6/00* (2006.01)
*C08F 4/04* (2006.01)
*C08F 4/80* (2006.01)
*C08F 4/34* (2006.01)

(56) References Cited

U.S. PATENT DOCUMENTS

2007/0299226 A1* 12/2007 Park et al. .................. 526/218.1
2010/0087605 A1   4/2010 Yamamoto et al.

FOREIGN PATENT DOCUMENTS

| | | |
|---|---|---|
| JP | 2004 211105 | 7/2004 |
| JP | 2008 101203 | 5/2008 |
| WO | 2011 125980 | 10/2011 |

OTHER PUBLICATIONS

International Search Report Issued Jan. 29, 2013 in PCT/JP12/082629 Filed Dec. 17, 2012.

* cited by examiner

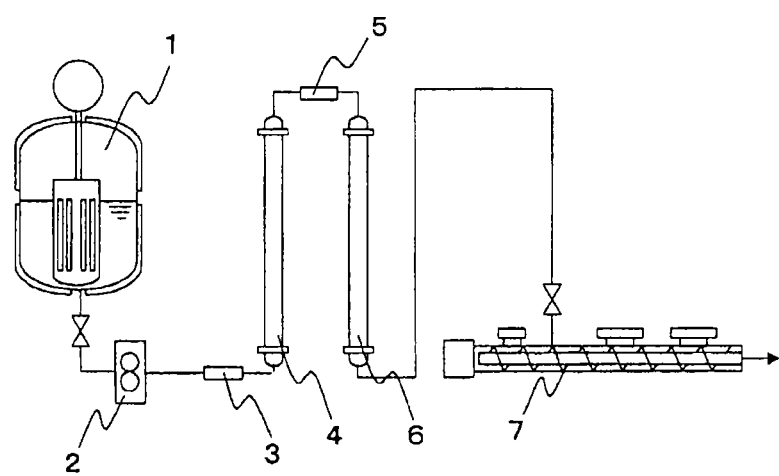

METHOD FOR PRODUCING METHACRYLIC-BASED POLYMER

TECHNICAL FIELD

The present invention relates to a method for continuously producing a methacrylic-based polymer by bulk polymerization.

BACKGROUND ART

The industrial production method of polymethyl methacrylate (PMMA) is conventionally a batch polymerization method using suspension polymerization method. Although this method is a production method suitable for the high-mix low-volume production, since auxiliary agents such as a dispersant are used, these remain in molding materials to thereby reduce the quality. In addition, for the aftertreatment, cleaning with a large volume of water and subsequent drying treatment are needed. Further since the polymerization operation is of a batch type, operations are inefficient and complicated, and simultaneously, the apparatus cost and the operational cost are high. Further in the present situation in which the pollution regulation is becoming strict, the release of a large volume of water or a cleaning water which is used in the polymerization and contains auxiliary agents such as a dispersant and an unreacted monomer is not preferable. The case where a treatment apparatus of the water or the cleaning water is equipped further increases the cost and cannot help bringing about the industrial disadvantage. In order to solve such a problem with the suspension polymerization method, methods for continuously producing methyl methacrylate (MMA) by bulk polymerization are proposed.

Patent Literature 1 discloses a method in which in production of an acrylic resin, by making the amount of a radical polymerization initiator added in a specific range in a continuous tank reactor, and by using a specific condition in a plug flow reactor following the reactor, a methacrylic-based polymer excellent in fabricability is produced in good productivity and stably.

CITATION LIST

Patent Literature

Patent Literature 1: JP2000-26507A

SUMMARY OF INVENTION

Technical Problem

The method disclosed in Patent Literature 1 is a production method giving a good pyrolysis resistance and providing a relatively high productivity. However, since the method restricts the amount of a radical polymerization initiator added in a continuous tank reactor in order to suppress the reduction of the pyrolysis resistance, the method has a limit in the productivity.

In addition, there is no clear description of a method of stably improving the polymerization ratio by specifying the temperature, and the half-life time of the radical polymerization initiator on the reactor wall surface in a plug flow reactor.

As a result of exhaustive studies, a method has been found in which a further improvement of the polymerization ratio can be anticipated and a further improvement of the productivity can be achieved, depending on conditions of a process of beforehand addition and mixing of a radical polymerization initiator used in a plug flow reactor. While there is further a possibility of causing clogging of a process line, depending on conditions of the process, finding of a method simultaneously satisfying both the stable operation and the productivity improvement has been made.

The present invention has been achieved in consideration of such conventional problems, and has an object to provide a method capable of producing a methacrylic-based polymer excellent in pyrolysis resistance and excellent in fabricability, in a high productivity and stably.

Solution to Problem

The problems can be solved by the following [1] to [5] of the present invention.

[1] A method for producing a methacrylic-based polymer, including the following Steps (1) and (2):

Step (1): using a complete mixing reactor (A) (hereinafter, referred to as "reactor (A)") to thereby obtain a first syrup with the step including the following steps (1)-1, (1)-2 and (1)-3:

(1)-1: continuously feeding a monomer mixture containing 80 to 99.9 mass % of methyl methacrylate and 0.1 to 20 mass % of an alkyl acrylate, 0.01 to 1.0 parts by mol of a mercaptan based on 100 parts by mol of the monomer mixture, and a first radical polymerization initiator (a) in an amount satisfying the following formula (1), to the reactor (A):

$$5.0 \times 10^{-5} < \alpha \le 1.75 \times \beta \times 10^{-6} + 6.0 \times 10^{-5} \quad (1)$$

wherein in the formula (1), $\alpha$ is a number of moles of the first radical polymerization initiator (a) based on 1 mol of the monomer mixture; and $\beta$ is a proportion (mass %) of an alkyl acrylate unit in the methacrylic-based polymer to be produced;

(1)-2: carrying out stirring and mixing at a temperature of the reactor (A) interior of 110 to 160° C., and carrying out polymerization so that a content of a polymer of the monomer mixture becomes 40 to 60 mass %; and (1)-3: continuously obtaining the first syrup from the reactor (A);

Step (2): using a reaction apparatus (D) including a plug flow mixer (B) (hereinafter, referred to as "mixer (B)") and a plug flow reactor (C) (hereinafter, referred to as "reactor (C)") to thereby obtain a second syrup, wherein a second radical polymerization initiator (c) is added to the first syrup with the mixer (B) having an inner wall temperature set at the temperature of the reactor (A) interior or higher and 230° C. or lower to thereby make a syrup mixture, and then polymerization is carried out by the reactor (C) to obtain the second syrup.

[2] A method for producing a methacrylic-based polymer, including the following Steps (1) to (3):

Step (1): using a reactor (A) to thereby obtain a first syrup with the step including the following steps (1)-1, (1)-2 and (1)-3:

(1)-1: continuously feeding a monomer mixture containing 80 to 99.9 mass % of methyl methacrylate and 0.1 to 20 mass % of an alkyl acrylate, 0.01 to 1.0 parts by mol of a mercaptan based on 100 parts by mol of the monomer mixture, and a first radical polymerization initiator (a) in an amount satisfying the following formula (1), to the reactor (A):

$$5.0 \times 10^{-5} < \alpha \le 1.75 \times \beta \times 10^{-6} + 6.0 \times 10^{-5} \quad (1)$$

wherein in the formula (1), $\alpha$ is a number of moles of the first radical polymerization initiator (a) based on 1 mol of the monomer mixture; and $\beta$ is a proportion (mass %) of an alkyl acrylate unit in the methacrylic-based polymer to be produced;

(1)-2: carrying out stirring and mixing at a temperature of the reactor (A) interior of 110 to 160° C., and carrying out polymerization so that a content of a polymer of the monomer mixture becomes 40 to 60 mass %; and (1)-3: continuously obtaining the first syrup from the reactor (A);

Step (2): using a reaction apparatus (D) including a mixer (B) and a reactor (C) to thereby obtain a second syrup with the step including the following steps of (2)-1, (2)-2 and (2)-3:

(2)-1: adding a second radical polymerization initiator (c) satisfying the following conditions (i) to (iii) to the first syrup, and carrying out mixing with the mixer (B) having an inner wall temperature set at the temperature of the reactor (A) interior or higher and 230° C. or lower to thereby make a syrup mixture:

Condition (i): a half-life period of the second radical polymerization initiator (c) at an inner wall temperature of the mixer (B) is 1,000 sec or shorter;

Condition (ii): a half-life period of the second radical polymerization initiator (c) at an inner wall temperature of the reactor (C) is 1,000 sec or shorter; and Condition (iii): an amount of the second radical polymerization initiator (c) added satisfies the following formula (2):

$$1.0 \times 10^{-6} < \gamma \le 0.25 \times \beta \times 10^{-6} + 5.0 \times 10^{-6} \quad (2)$$

wherein in the formula (2), $\gamma$ is a number of moles of the second radical polymerization initiator (c) based on 1 mol of the monomer mixture; and $\beta$ is a proportion (mass %) of an alkyl acrylate unit in the methacrylic-based polymer to be produced;

(2)-2: polymerizing the syrup mixture in the reactor (C) having an inner wall temperature set at the temperature of the reactor (A) interior or higher and 230° C. or lower to thereby make a polymerized mixture; and (2)-3: obtaining the second syrup having a content of a polymer in the polymerized mixture of 50 to 90 mass %; and Step (3): feeding the second syrup to a volatile-removing apparatus (E), and continuously separating and removing volatile.

[3] The method for producing a methacrylic-based polymer according to [1] or [2], including using a reaction apparatus (D) wherein n sets of a mixer (Bn) and a reactor (Cn) (n is an integer of 1 or more) are arranged in the order of a mixer (Bn) and a reactor (Cn), and adding the second radical polymerization initiator (cn) (n is an integer of 1 or more) in an inlet port of each of the mixers (Bn) and successively carrying out polymerization in each of the reactors (Cn) to thereby obtain the second syrup.

[4] The method for producing a methacrylic-based polymer according to any one of [1] to [3], wherein an amount of the first radical polymerization initiator (a) fed in Step (1) satisfies the following formula (3):

$$5.0 \times 10^{-5} < \alpha \le 1.75 \times \beta \times 10^{-6} + 5.0 \times 10^{-5} \quad (3)$$

wherein in the formula (3), $\alpha$ is a number of moles of the first radical polymerization initiator (a) based on 1 mol of the monomer mixture; and $\beta$ is a proportion (mass %) of an alkyl acrylate unit in the methacrylic-based polymer to be produced.

[5] The method for producing a methacrylic-based polymer according to any one of [1] to [4], wherein a residence time of the syrup in the mixer (B) in Step (2) is 1 to 30 sec;

wherein the following formula (4) is satisfied:

$$y < x + 5 \quad (4)$$

wherein x is a syrup temperature (° C.) at an inlet port of the mixer (B), and y is a syrup temperature (° C.) at an outlet port of the mixer (B); and wherein a residual ratio of the second radical polymerization initiator (c) contained in the syrup at the outlet port of the mixer (B) is 95% or higher.

Advantageous Effect of Invention

The present invention can produce a methacrylic-based polymer excellent in pyrolysis resistance and excellent in fabricability, in a high productivity and stably.

BRIEF DESCRIPTION OF DRAWING

FIGURE is a schematic diagram showing an apparatus used in Examples.

DESCRIPTION OF EMBODIMENT

The present invention is a method for producing a methacrylic-based polymer including the following Steps (1) and (2).

Step (1): using a reactor (A) to thereby obtain a first syrup with the step including the following steps (1)-1, (1)-2 and (1)-3:

(1)-1: continuously feeding a monomer mixture containing 80 to 99.9 mass % of methyl methacrylate and 0.1 to 20 mass % of an alkyl acrylate, 0.01 to 1.0 parts by mol of a mercaptan based on 100 parts by mol of the monomer mixture, and a first radical polymerization initiator (a) in an amount satisfying the following formula (1), to the reactor (A):

$$5.0 \times 10^{-5} < \alpha \le 1.75 \times \beta \times 10^{-6} + 6.0 \times 10^{-5} \quad (1)$$

wherein in the formula (1), $\alpha$ is a number of moles of the first radical polymerization initiator (a) based on 1 mol of the monomer mixture; and $\beta$ is a proportion (mass %) of an alkyl acrylate unit in the methacrylic-based polymer to be produced;

(1)-2: carrying out stirring and mixing at a temperature of the reactor (A) interior of 110 to 160° C., and carrying out polymerization so that a content of a polymer of the monomer mixture becomes 40 to 60 mass %; and (1)-3: continuously obtaining the first syrup from the reactor (A);

Step (2): using a reaction apparatus (D) including a plug flow mixer (B) and a plug flow reactor (C) to thereby obtain a second syrup, wherein a second radical polymerization initiator (c) is added to the first syrup with the mixer (B) having an inner wall temperature set at the temperature of the reactor (A) interior or higher and 230° C. or lower to thereby make a syrup mixture, and then polymerization is carried out by the reactor (C) to obtain the second syrup.

In addition, the present invention includes, for example, a method for producing a methacrylic-based polymer including the following Steps (1) to (3):

Step (1): using a reactor (A) to thereby obtain a first syrup with the step including the following steps (1)-1, (1)-2 and (1)-3:

(1)-1: continuously feeding a monomer mixture containing 80 to 99.9 mass % of methyl methacrylate and 0.1 to 20 mass % of an alkyl acrylate, 0.01 to 1.0 parts by mol of a mercaptan based on 100 parts by mol of the monomer mixture, and a first radical polymerization initiator (a) in an amount satisfying the following formula (1), to the reactor (A):

$$5.0 \times 10^{-5} < \alpha \le 1.75 \times \beta \times 10^{-6} + 6.0 \times 10^{-5} \quad (1)$$

wherein in the formula (1), α is a number of moles of the first radical polymerization initiator (a) based on 1 mol of the monomer mixture; and β is a proportion (mass %) of an alkyl acrylate unit in the methacrylic-based polymer to be produced;

(1)-2: carrying out stirring and mixing at a temperature of the reactor (A) interior of 110 to 160° C., and carrying out polymerization so that a content of a polymer of the monomer mixture becomes 40 to 60 mass %; and (1)-3; continuously obtaining the first syrup from the reactor (A);

Step (2): using a reaction apparatus (D) including a mixer (B) and a reactor (C) to thereby obtain a second syrup with the step including the following steps of (2)-1, (2)-2 and (2)-3:

(2)-1: adding a second radical polymerization initiator (c) satisfying the following conditions (i) to (iii) to the first syrup, and carrying out mixing with the mixer (B) having an inner wall temperature set at the temperature of the reactor (A) interior or higher and 230° C. or lower to thereby make a syrup mixture:

Condition (i): a half-life period of the second radical polymerization initiator (c) at an inner wall temperature of the mixer (B) is 1,000 sec or shorter;

Condition (ii): a half-life period of the second radical polymerization initiator (c) at an inner wall temperature of the reactor (C) is 1,000 sec or shorter; and Condition (iii): an amount of the second radical polymerization initiator (c) added satisfies the following formula (2):

$$1.0\times10^{-6} < \gamma \le 0.25 \times \beta \times 10^{-6} + 5.0 \times 10^{-5} \quad (2)$$

wherein in the formula (2), γ is a number of moles of the second radical polymerization initiator (c) based on 1 mol of the monomer mixture; and β is a proportion (mass %) of an alkyl acrylate unit in the methacrylic-based polymer to be produced;

(2)-2: polymerizing the syrup mixture in the reactor (C) having an inner wall temperature set at the temperature of the reactor (A) interior or higher and 230° C. or lower to thereby make a polymerized mixture; and (2)-3: obtaining the second syrup having a content of a polymer in the polymerized mixture of 50 to 90 mass %; and Step (3): feeding the second syrup to a volatile-removing apparatus (E), and continuously separating and removing volatile.

The method for producing a methacrylic-based polymer according to the present invention, when the monomer mixture containing methyl methacrylate as a main component is continuously bulk polymerized using a complete mixing reactor and a plug flow reactor following the reactor, can stably control the polymerization reaction, and can provide the methacrylic-based polymer excellent in pyrolysis resistance and good in fabricability, in a high production quantity per unit volume and unit time.

In the present invention, "syrup" is a mixture of a methacrylic-based polymer and an unreacted monomer mixture in which a part of a monomer mixture is polymerized.

The methacrylic-based polymer produced by the method according to the present invention is a copolymer containing 80 to 99.9 mass % of a methyl methacrylate unit and 0.1 to 20 mass % of an alkyl acrylate unit. Here, the total of the methyl methacrylate unit and the alkyl acrylate unit is taken to be 100 mass %.

The production method of the methacrylic-based polymer uses a monomer mixture containing methyl methacrylate and an alkyl acrylate as monomers.

The alkyl group of the alkyl acrylate is preferably an alkyl group having 1 to 18 carbon atoms. The alkyl group includes, for example, methyl group, ethyl group, n-propyl group, n-butyl group, 2-ethylhexyl group, dodecyl group and stearyl group. These alkyl acrylates may be used singly or in combinations of two or more.

The methacrylic-based polymer produced by the method according to the present invention is preferably a copolymer of, particularly, methyl methacrylate with an alkyl acrylate selected from the group consisting of methyl acrylate, ethyl acrylate and butyl acrylate.

Methyl methacrylate has a polymerization activity different from that of an alkyl acrylate to be copolymerized. Therefore, in the case of aiming at obtaining the methacrylic-based polymer of the composition, the composition of the monomer mixture to be fed as raw materials, as long as being in the range of 80 to 99.9 mass % of methyl methacrylate and 0.1 to 20 mass % of an alkyl acrylate, can be suitably selected depending on their polymerization activity.

In the method according to the present invention, raw materials containing the monomer mixture, a mercaptan and the first radical polymerization initiator (a) are continuously fed to one reaction area.

A mercaptan used in the present invention includes, for example, primary, secondary and tertiary mercaptans having an alkyl group or a substituted alkyl group, such as n-butyl mercaptan, isobutyl mercaptan, n-octyl mercaptan, n-dodecyl mercaptan, sec-butyl mercaptan, sec-dodecyl mercaptan and tert-butyl mercaptan; aromatic mercaptans such as phenyl mercaptan, thiocresol and 4-tert-butyl-o-thiocresol; thioglycolic acid and esters thereof; and mercaptans having 3 to 18 carbon atoms such as ethylene thioglycol. These can be used singly or in combinations of two or more. In these mercaptans, tert-butyl mercaptan, n-butyl mercaptan, n-octyl mercaptan and n-dodecyl mercaptan are preferable.

In the present invention, the amount of a mercaptan used is preferably 0.01 to 1.0 mol % based on a monomer mixture. In the case where the amount of a mercaptan used is 0.01 mol % or higher, it tends to be easy to control the reaction rate, and to obtain the methacrylic-based polymer in a constant quality and excellent in fabricability. By contrast, in the case where the amount of a mercaptan used is 1.0 mol % or lower, the degree of polymerization is sufficient to thereby obtain good product strength. The amount of a mercaptan used is more preferably 0.05 to 0.5 mol %, and still more preferably 0.1 to 0.4 mol % based on a monomer mixture.

The first radical polymerization initiator (a) used in the present invention is not especially limited as long as decomposing and generating radicals at a polymerization temperature.

The first radical polymerization initiator (a) includes, for example, organic peroxides such as tert-butylperoxy-3,5,5-trimethyl hexanoate, tert-butylperoxy laurate, tert-butylperoxy isopropyl monocarbonate, tert-hexylperoxy isopropyl monocarbonate, tert-butylperoxy acetate, 1,1-bis(tert-butylperoxy)-3,3,5-trimethylcyclohexane, 1,1-bis(tert-butylperoxy)cyclohexane, tert-butylperoxy-2-ethyl hexanoate, tert-butylperoxy isobutyrate, tert-hexyl-hexylperoxy-2-ethyl hexanoate, di-tert-butyl peroxide and 2,5-dimethyl-2,5-bis(tert-butylperoxy)hexane; azo compounds such as 2-(carbamoylazo)-isobutyronitrile, 1,1'-azobis(1-cyclohexanecarbonitrile), 2,2'-azobisisobutyronitrile, 2,2'-azobis(2-methylbutyronitrile), dimethyl-2,2'-azobisisobutyrate, 2,2'-azobis(2,4,4-trimethylpentane) and 2,2'-azobis(2-methylpropane); persulfate salts such as potassium persulfate; and redox type polymerization initiators.

These radical polymerization initiators may be used singly or as a mixture of two or more. However, since the case where two or more first radical polymerization initiators (a) are used in Step (1) makes the polymerization complicated, one thereof is preferably used alone.

Hereinafter, Step (1) to Step (3) will be described in detail.

Step (1)

In the present invention, the first syrup is obtained using a complete mixing reactor (A).

In the present invention, the amount of the first radical polymerization initiator (a) used in Step (1) is an amount satisfying the following formula (1).

$$5.0\times10^{-5} < \alpha \leq 1.75 \times \beta \times 10^{-6} + 6.0 \times 10^{-5} \quad (1)$$

wherein in the formula (1), α is the number of moles of the first radical polymerization initiator (a) based on 1 mol of the monomer mixture; and β is a proportion (mass %) of an alkyl acrylate unit in the methacrylic-based polymer to be produced.

In the formula (1), in the case where α is $5.0\times10^{-5}$ or lower, the production quantity of the methacrylic-based polymer per unit volume and unit time in the reactor (A) decreases. By contrast, if a exceeds $1.75\times\beta\times10^{-6}+6.0\times10^{-5}$, the pyrolysis resistance of the methacrylic-based polymer decreases to such an extent that the molding condition is extremely restricted.

The amount of the first radical polymerization initiator (a) used in Step (1) is preferably an amount satisfying the following formula (3).

$$5.0\times10^{-5} < \alpha \leq 1.75 \times \beta \times 10^{-6} + 5.0 \times 10^{-5} \quad (3)$$

If α is in the range of $1.75\times b\times10^{-6}+5.0\times10^{-5}$ or lower, since the decrease in the pyrolysis resistance associated with the increase of the amount of the radical polymerization initiator used is very gentle, the amount of the first radical polymerization initiator (a) used can be increased in the state of the high pyrolysis resistance being maintained.

In the method according to the present invention, the first syrup is continuously obtained from the reactor (A) by carrying out continuously polymerization by carrying out substantially homogeneous stirring and mixing at a temperature of the reactor (A) interior of 110° C. or higher and 160° C. or lower. The temperature of the reactor (A) interior is preferably made to be 120° C. or higher and 140° C. or lower.

In the case where the temperature (hereinafter, also referred to as polymerization temperature) of the reaction mixture in the reactor (A) is 110° C. or higher, since the viscosity is suitable and mixing or heat transfer can be sufficiently achieved easily to thereby make the stable control of the reaction easy, it tends to be easy to obtain the polymer content ϕ of the reaction mixture described later. By contrast, in the case where the polymerization temperature is 160° C. or lower, the formation of side reaction products such as a dimer of methyl methacrylate tends to be able to be suppressed, the decrease of the syndiotactic structure can be suppressed in the viewpoint of polymer stereoregularity, and the decrease of the heat resistance and the fabricability of the methacrylic-based polymer tends to be able to be suppressed.

Since heat is generated due to the polymerization reaction and the stirring and mixing in the reactor (A), heat is removed, or as the case may be, heat is added to control the polymerization temperature at a predetermined one. The temperature control can be carried out by well-known methods. Methods can be employed, for example, the heat transfer/heat removal or heat addition with circulation of a heat medium to, for example, a jacket, a draft tube or coil installed in a complete mixing reactor, or the like, the cooled feeding of a monomer mixture, and the reflux cooling.

In the present invention, the polymer content ϕ (mass %) (hereinafter, also referred to as polymerization ratio ϕ) of the first syrup continuously taken out from the reactor (A) is preferably maintained at a substantially constant value satisfying $40 \leq \phi \leq 60$. In the case where the polymerization ratio ϕ is 40% or higher, the increase of the cost necessary for separation of volatile containing unreacted monomers as main components tends to be able to be suppressed. By contrast, in the case where the polymerization ratio ϕ is 60% or lower, mixing and heat transfer are sufficiently achieved to thereby tend to be able to conduct the stable operation. It is more preferable that the polymerization ratio ϕ satisfies $45 \leq \phi \leq 55$.

In the reactor (A), the polymerization can be carried out, for example, as follows. By introducing an inert gas such as nitrogen to raw material monomers, or by holding the raw material monomers at a reduced pressure for a certain time, the dissolved oxygen concentration is made to be 2 ppm by mass or lower, more preferably 1 ppm by mass or lower. If the dissolved oxygen concentration is made to be such a low concentration, the polymerization reaction stably proceeds, and even if a high temperature is held for a long time in the polymerization process, colored components are scarcely formed, thus a high-quality polymer tends to be obtained.

In the method according to the present invention, as the reactor (A), a tank-type reaction apparatus installed with a feed port and a taking-out port and equipped with a stirring device can be used. The stirring device has a mixing capability across the whole reaction area. In the case where a large amount of a radical polymerization initiator is used as in the present invention, the tank-type reaction apparatus is preferable which has a mechanism capable of feeding a solvent in order to improve the safety in polymerization of a reaction mixture in the reaction area. As the solvent, any one may be used, but a solvent such as toluene, whose boiling point is about 100° C. or higher, is preferable. The mechanism capable of feeding a solvent can use a well-known method including, for example, a method of using a pump capable of feeding the solvent at a delivery pressure equal to or higher than the pressure in the reactor and a method of pressurizing a vessel holding a solvent at a pressure equal to or higher than the pressure in the reaction area to thereby pressure-feed the solvent. Further assuming the case where the power supply becomes difficult due to power failure or the like, it is preferable that an emergency power source is secured for the mechanism which can feed a solvent and the stirring device.

Continuous extraction of the first syrup from the reactor (A) and feeding thereof to the mixer (B) can be carried out by a well-known method including a method using a commercially available pump. The commercially available pump is preferably, for example, a gear pump. By extracting the reaction liquid with the pump, the reaction liquid can be fed stably to the following step.

Step (2)

In the present invention, the second syrup is obtained by using the reaction apparatus (D) composed of the mixer (B) and the reactor (C). That is, first, the second radical polymerization initiator (c) is added to the first syrup extracted from the reactor (A), and mixed by the mixer (B), and then, the polymerization is advanced in the plug flow reactor (C). As the reaction apparatus (D), n sets of the mixer (Bn) and the reactor (Cn) (n is an integer of 1 or more) arranged in the order of the mixer (Bn) and the reactor (Cn) can be used. In this case, the second radical polymerization initiator (cn) can be added to an inlet port of each mixer (Bn). Each second radical polymerization initiator (cn) may be an identical radical polymerization initiator or a different radical polymerization initiator. The amount of each second radical polymerization initiator (cn) added may also be the same amount or a different amount.

The pressure of the interiors of the mixer (B) and the reactor (C) arranged in series with the reactor (A) can be raised to a pressure equal to or higher than the vapor pressure of the reaction liquid. The pressure is preferably 0.5 to 5 MPa and equal to or higher than the vapor pressure of the reaction liquid. By maintaining the pressure of the reactor interior at a pressure equal to or higher than the vapor pressure of the reaction liquid, bubbling of the reaction liquid is suppressed and clogging by bubbling tends to be able to be prevented.

In the case where only one set of the reaction apparatus (D) is used, the first syrup extracted from the reactor (A) by the method is mixed with the second radical polymerization initiator (c) by the mixer (B) installed following the reactor to thereby obtain the syrup mixture, and polymerized in the reactor (C) to thereby obtain the second syrup. In the case where as the reaction apparatus (D), n sets of the mixer (Bn) and the reactor (Cn) (n is an integer of 1 or more) arranged in the order of the mixer (Bn) and the reactor (Cn) is used, the syrup obtained in the reactor (Cn) is the second syrup.

In the mixer (B), the inner wall temperature of the mixer (B) is set at a temperature equal to or higher than the temperature of the reactor (A) interior and 230° C. or lower.

If the inner wall temperature of the mixer (B) is the temperature of the reactor (A) interior or higher, the increase of the viscosity of the syrup mixture on the inner wall surface of the mixer (B) can be suppressed, clogging of the mixer tends to be suppressed, and the long-term operation tends to be able to be achieved. In addition, if the inner wall temperature of the mixer (B) is 230° C. or lower, the decomposition of the second radical polymerization initiator (c) is suppressed, and the polymerization ratio tends to be able to be sufficiently raised in the reactor (C) of the post-step. The inner wall temperature of the mixer (B) is preferably 200° C. or lower.

The second radical polymerization initiator (c) usable is, for example, a radical polymerization initiator similar to the first radical polymerization initiator (a). The first radical polymerization initiator (a) and the second radical polymerization initiator (c) to be used may be an identical radical polymerization initiator or different radical polymerization initiators.

The amount of the second radical polymerization initiator (c) used is preferably an amount satisfying the following formula (2) (Condition iii).

$$1.0 \times 10^{-6} < \gamma \leq 0.25 \times \beta \times 10^{-6} + 5.0 \times 10^{-5} \quad (2)$$

wherein in the formula (2), $\gamma$ is the number of moles of the second radical polymerization initiator (c) based on 1 mol of the monomer mixture; and $\beta$ is a proportion (mass %) of the alkyl acrylate unit in the methacrylic-based polymer to be produced.

In the formula (2), in the case where $\gamma$ exceeds $1.0 \times 10^{-6}$, the polymerization sufficiently proceeds in the reactor (C), high polymerization ratio can be obtained, and high production quantity tends to be able to be obtained. By contrast, if $\gamma$ is $0.25 \times \beta \times 10^{-6} + 5.0 \times 10^{-5}$ or lower, the high pyrolysis resistance of the molding produced by using the methacrylic-based polymer obtained tends to be able to be achieved. In the case where as the reaction apparatus (D), n sets of the mixer (Bn) and the reactor (Cn) (n is an integer of 1 or more) arranged in the order of the mixer (Bn) and the reactor (Cn) is used, the second radical polymerization initiator (cn) is added to an inlet port of each mixer (Bn). In this case, the amount of the second radical polymerization initiator (c) used in the formula (2) is the total of the amounts of the second radical polymerization initiator (cn).

In addition, in the present invention, when the polymerization is further advanced in the subsequent reactor (C), the second radical polymerization initiator (c) having a half-life time at the temperature of the mixer (B) inner wall of 1,000 sec or shorter can be added (Condition i). If the half-life period is 1,000 sec or shorter, the polymerization ratio hardly becomes high in portions of the wall surface of the mixer (B) where the fluidity is low, and clogging of the mixer (B) tends to be able to be suppressed. The half-life period is preferably 500 sec or shorter. By contrast, in the case where the half-life period is too short, no difficulty is caused on the operation, but the decomposition of the second radical polymerization initiator (c) becomes fast and the polymerization ratio cannot sufficiently be raised, and dimers only are formed during the passage through the subsequent reactor (C) to thereby form polymers inferior in physical properties in some cases. Therefore, the second radical polymerization initiator (c) having a half-life period of 0.1 sec or longer is preferably used.

In addition, in the case where the first syrup and the second radical polymerization initiator (c) are mixed in the mixer (B), it is preferable that the following conditions are satisfied.
1) The residence time of the syrup in the mixer (B) is 1 to 30 sec.
2) The following formula (4) is satisfied:

$$y < x + 5 \quad (4)$$

wherein x is the syrup temperature (° C.) at the inlet port of the mixer (B), and y is the syrup temperature (° C.) at the outlet port of the mixer (B).
3) The residual ratio of the second radical polymerization initiator (c) contained in the syrup at the outlet port of the mixer (B) is 95% or higher.

In the case, as the reaction apparatus (D), n sets of the mixer (Bn) and the reactor (Cn) (n is an integer of 1 or more) arranged in the order of the mixer (Bn) and the reactor (Cn) is used, the syrup temperature (° C.) (x) at the inlet port of each mixer (Bn) and the syrup temperature (° C.) (y) at the outlet port of each mixer (Bn) preferably satisfy the formula (4).

In some cases where the syrup is passed and mixed in a residence time of 1 sec or longer in the mixer (B), the diameter of the mixer (B) becomes suitable, and a pressure loss tends to be able to be suppressed. In addition, in some cases where the syrup is passed and mixed in a time of 30 sec or shorter, the proceed of the decomposition before being dispersed the radical polymerization initiator (c) in the mixer (B) and being mixed with the first syrup can be suppressed, and the decrease of the residual ratio of the radical polymerization initiator (c) contained in the syrup at the outlet port of the mixer (B) tends to be able to be suppressed. In addition, if a residence time of the syrup in the mixer (B) is 30 sec or shorter, the increase of the temperature of the syrup receiving heat from the jacket and obtained at the outlet port of the mixer (B) tends to be able to be suppressed.

In the case where the temperature (y) is lower than x+5, the inlet port temperature of the reactor (C) decreases and the polymerization proceeds from a low temperature in the reactor (C). Therefore, the radical polymerization initiator (c) contained in the syrup in the mixer (B) outlet port is gradually decomposed and the polymerization can be advanced while the initiator is being efficiently consumed, which is preferable.

In the case where the residual ratio of the radical polymerization initiator (c) contained in the syrup in the mixer (B) outlet port is 95% or higher, since the amount of the radical polymerization initiator (c) consumed substantially for the polymerization in the subsequent reactor (C) increases, the polymerization ratio can be raised more, which is preferable.

The residual ratio of the second radical polymerization initiator (c) can be calculated by a well-known method. As the residual ratio of the second radical polymerization initiator (c) in the syrup obtained at the mixer (B) outlet port, for example, a value calculated by the following formulas (5) and (6) is used.

$$c2 = c1 \cdot \exp(-kd \cdot \tau) \quad (5)$$

$$\text{Residual ratio } [\%] = c2/c1 \quad (6)$$

c1: an addition concentration [mol/1-mol monomer] of the second radical polymerization initiator (c) in Step (2)
c2: a residual concentration [mol/1-mol monomer] of the second radical polymerization initiator (c) contained in the syrup in the mixer (B) outlet port
τ: an average residence time [sec] in the mixer (B)
kd: a decomposition rate constant (function of temperature) [1/sec] of the second radical polymerization initiator (c)

As the temperature used in calculation of kd, the second syrup temperature (° C.) (y) in the mixer (B) outlet port is used.

In order to more effectively carry out the present invention, the mixer (B) is preferably a tube mixer with a jacket internally installed with a static mixer. Use of a static mixer not only can simplify the apparatus body, but also can reduce the facility cost because of no need for a power necessary for stirring and thus no need for any attached facility, and can reduce the running cost. A static mixer usable is commercially available, and is suitably, for example, a static mixer from Noritake Co., Ltd. or a Sulzer Mixer from Sumitomo Heavy Industries, Ltd.

In the present invention, the polymerization ratio of the syrup having been passed in the mixer (B) is further raised by the reactor (C) following the mixer (B) to thereby raise the polymerization ratio in the syrup obtained at the outlet port of the reactor (C).

Raising the polymerization ratio in Step (2) can reduce the burden of removing volatile to the following Step (3), and exhibits a large industrial merit as an economically advantageous production method.

In the present invention, the inner wall temperature of the reactor (C) is set at a temperature equal to or higher than the temperature of the reactor (A) interior and lower than 230° C. as in the case of the mixer (B).

If the inner wall temperature of the reactor (C) is the temperature of the reactor (A) interior or higher, the increase of the viscosity of the syrup on the inner wall surface of the reactor (C) is suppressed, clogging of the mixer is able to be suppressed, and the long-term operation tends to be able to be achieved. In addition, if the inner wall temperature of the reactor (C) is 230° C. or lower, the decomposition of the radical polymerization initiator (c) is suppressed, and the sufficient polymerization ratio tends to be able to be obtained. The temperature is preferably 200° C. or lower.

In addition, the half-life time of the second radical polymerization initiator (c) contained in the syrup at the outlet port of the mixer (B) at the inner wall temperature of the reactor (C) is preferably 1,000 sec or shorter (Condition ii). If the half-life period is 1,000 sec or shorter, the increase of the polymerization ratio in portions of the wall surface of the reactor where the fluidity is low tends to be able to be suppressed, and clogging of the reactor (C) tends to be able to be suppressed. The half-life period is more preferably 500 sec or shorter. By contrast, in the case where the half-life period is too short, no difficulty is caused on the operation, but the decomposition of the radical polymerization initiator (c) becomes fast and the polymerization ratio cannot sufficiently be raised, and dimers only are formed to thereby form polymers inferior in physical properties in some cases. Therefore, a radical initiator having a half-life period of 0.1 sec or longer is preferably used.

In the present invention, the average residence time of the syrup in the reactor (C) is preferably in the range of 1 min to 1 hour. If the average residence time is 1 min or longer, the sufficient polymerization ratio tends to be able to be obtained. By contrast, if the average passage time is 1 hour or shorter, the formation of dimers is suppressed, and the good productivity tends to be able to be obtained.

Further in the present invention, the production is carried out so that the polymer content (final polymerization ratio) of the second syrup at the outlet port of the reactor (C) is in the range of 50 to 90 mass %. In the case where the final polymerization ratio is 50 mass % or higher, the advantage of the present invention tends to be able to be developed. By contrast, in the case where the final polymerization ratio is 90 mass % or lower, the decrease of the fluidity of the second syrup can be suppressed, the stable conveyance of the second syrup tends to be able to be conducted. The final polymerization ratio is preferably 55 to 85 mass %, and more preferably 60 to 80 mass %.

In the present invention, the reactor (C) is preferably a tube mixer with a jacket internally installed with a static mixer. Use of a static mixer not only can simplify the apparatus body, but also can reduce the facility cost because of no need for a power necessary for stirring and thus no need for any attached facility, and can reduce the running cost. A static mixer usable is commercially available, and is suitably, for example, a static mixer from Noritake Co., Ltd. or a Sulzer Mixer from Sumitomo Heavy Industries, Ltd.

In the present invention, it is preferable that according to the rise in the syrup temperature due to the polymerization heat generation, Step (2) is carried out in plural times for respective temperature regions to thereby successively raise the syrup temperature. Specifically, after Step (1), the syrup is passed through Step (2) whose temperature is set at a higher temperature than Step (1) to thereby raise the polymerization ratio. In the case where n sets of the plug flow reactor (Cn) and the plug flow mixer (Bn) are further arranged after the mixer (B) in the reaction apparatus (D), it is preferable that the temperature of the inlet port side of the reactor (Cn) is set high to raise the polymerization ratio.

Thereby, while the formation of dimers is suppressed, the rapid decomposition of the radical polymerization initiator is suppressed and the polymerization ratio can effectively be raised.

In this case, the half-life time of the second radical polymerization initiator (c) added to the inlet port of each mixer (Bn) at the inner wall surface temperature of the mixer (B) and the reactor (C) is 1,000 sec or shorter. Each second radical polymerization initiator (c) is preferably one successively having longer 10-hour half-life temperatures from the inlet port sides.

In the case, as the reaction apparatus (D), n sets of the mixer (Bn) and the reactor (Cn) (n is an integer of 1 or more) arranged in the order of the mixer (Bn) and the reactor (Cn) is used, the amount of the second radical polymerization initiators (c) added is the total of the amounts of the radical polymerization initiators (cn) added before the passage through each mixer (Bn) as described before.

Step (3)

In the present invention, the second syrup obtained in Step (2) is fed to the volatile-removing apparatus (E) following the step, and by Step (3) of continuously separating and removing volatile, the methacrylic-based polymer can be obtained.

As the volatile-removing apparatus (E), any method may be used as long as the method is capable of separating and removing volatile from the second syrup and taking out the methacrylic-based polymer, and the method can be carried out, for example, by using a devolatilization extruder.

At this time, the second syrup may be at the temperature itself of the state obtained in Step (2), or may be further heated. In the case where the second syrup is further heated, the heating temperature is preferably 250° C. or lower, more preferably 230° C. or lower, and still more preferably 210° C. or lower. In some cases where the heating temperature is 250° C. or lower, the production of dimers tends to be able to be suppressed.

In a devolatilization extruder, it is preferable that the second syrup is released under a reduced pressure of 0.0001 to 0.1 MPa to thereby continuously remove the most part of volatile containing methacrylic monomers as a main component.

The content of the monomer mixture in a methacrylic-based polymer obtained by separating and removing volatile is preferably 0.3 mass % or lower. The content of dimers of the monomer mixture is preferably 0.1 mass% or lower. The content of mercaptans is preferably 50 ppm by mass or lower.

Volatile such as an unreacted monomer mixture is preferably condensed and recovered by a condenser and reutilized as a raw material of Step (1) from the viewpoint of economic efficiency. At this time, it is more preferable that after high-boiling point components such as dimers of a monomer mixture contained in the volatile are separated and removed by distillation, the components be reutilized as a raw material of Step (1).

In the case where a devolatilization extruder is used, the extruder may be of either of a single-screw and a twin-screw type. The surface of the screw of the devolatilization extruder is preferably one subjected to a coating. The coating includes, for example, hard chromium plating, titanium nitride coating and chromium nitride coating. By applying the coating to improve the releasability of a resin from the screw surface, residence of the resin on the screw surface is reduced, and the formation of carbides and the like due to high-temperature heating of the residing resin is suppressed.

In the case where the methacrylic-based polymer produced in such a way is used as a molding material, a lubricant such as higher alcohols and higher fatty acid esters can be added. Further as required, an ultraviolet absorbent, a heat stabilizer, a coloring agent, an antistatic agent, an antioxidant, and the like can be added.

The methacrylic-based polymer obtained in the present invention has the feature of being excellent in the quality, particularly fabricability, when being used as a molding material. How good or poor fabricability can use a temperature width allowing fabrication as its measure, and a larger width thereof is preferable. The lower limit temperature in the temperature width is determined mainly depending on the fluidity of a shaping material, and can relatively easily be controlled by varying the degree of polymerization, the amount of a copolymerizing component, and the amount of a plasticizer.

On the other hand, the upper limit temperature of the temperature width depends on the pyrolysis resistance and the volatile content of the shaped material. The pyrolysis resistance of a polymer is determined mainly by the number of double bonds of polymer chain terminals associated with the termination reaction of polymer radicals, and the amount of an alkyl acrylate copolymerized. Fewer double bonds give better pyrolysis resistance. Since the double bonds of the polymer chain terminals become starting points of pyrolysis by heating in molding, fewer double bonds are preferable. Since the number of double bonds of polymer chain terminals increases along with the amount of a radical polymerization initiator added, a smaller amount added thereof is preferable. A larger amount of an alkyl acrylate copolymerized gives better pyrolysis resistance. The alkyl acrylate is highly resistive to pyrolysis, and has an effect of stopping the pyrolysis of a polymer chain.

As shown in the formulas (1) to (3), since a larger amount of an alkyl acrylate copolymerized has a higher suppression effect on pyrolysis of a polymer, a larger amount of a radical polymerization initiator can be added, and a polymer maintaining good pyrolysis resistance can be obtained in a high productivity.

The amount of the alkyl acrylate unit copolymerized in the methacrylic-based polymer is 0.1 to 20 mass %, preferably 2 to 15 mass %, and more preferably 5 to 15 mass %. In the case where the amount is 0.1 mass % or higher, the decrease of the pyrolysis resistance can be suppressed. In the case where the amount is 20 mass % or lower, the molding obtained has a good pyrolysis resistance and heat resistance. If the amount of the alkyl acrylate unit copolymerized is increased, since the glass transition temperature of a copolymer generally decreases and the heat resistance decreases, the amount copolymerized may be selected according to applications as a molding material, and desired physical properties such as pyrolysis resistance, heat resistance and fluidity.

EXAMPLES

Hereinafter, the present invention will be described in more detail by way of Examples, but these do not limit the present invention.

1) The Amount Of Residual Monomers And The Amount Of Residual Dimers

A solution in which a part of a methacrylic-based polymer was dissolved in acetone was measured using a HP-6890 Gas Chromatography (trade name, manufactured by Agilent Technologies, Inc.). By calculating the content of each component with the internal standard method, the amount of residual monomers and the amount of residual dimers were determined (mass %).

2) The Pyrolysis Resistance

A part of a methacrylic-based polymer was dissolved in acetone, and thereafter reprecipitation refined with n-hexane. The reprecipitate was vacuum dried at 90 to 100° C. for one day, and crushed to thereby obtain a sample. The measurement used a simultaneous thermogravimetric/differential thermal analyzer (trade name: TG/DTA 6300, manufactured by Seiko Instruments Inc.). A platinum container in which 10 mg of the sample was enclosed was held at 100° C. for 30 min under nitrogen atmosphere to pre-dry the sample. Thereafter, the container was heated to 600° C. at a heating rate of 5° C./min, and a temperature (° C.) at which 1% of the mass of the sample was lost by pyrolysis was measured.

3) The Heat Resistance

A deflection temperature under load (° C.) was measured according to the test condition A of JIS K7191-2.

4) The Amount of Production

A mass (kg) of a polymer obtained per unit volume ($m^3$) and unit time (hr) was taken as a production quantity (kg/hr/$m^3$).

5) The Polymer Content φ

The content of a methacrylic-based polymer was calculated from the material balance of a methacrylic-based polymer obtained from a devolatilization extruder and unreacted monomers separated and removed, based on a monomer mixture as a raw material.

6) The Content of Alkyl Acrylate Unit in a Polymer

A polymer with several milligrams was decomposed at a decomposition temperature of 500° C. using a Double Shot Pyrolyzer (trade name: PY-2010D, manufactured by Frontier Laboratories Ltd.). The components of the decomposed gases generated were separated using a separation column, HP-WAX (trade name, 0.32 mm in diameter, 30 m in length, 0.25 µm in membrane thickness) attached to an FID detector gas chromatography HP-6890 (trade name, manufactured by Agilent Technologies, Inc.), with conditions of a column measuring temperature program of keeping at 40° C. for 5 min, and then heating to 200° C. (rate: 10° C./min), and a carrier gas of He (1.2 ml/min, a linear velocity of 40 cm/sec). The content of an alkyl acrylate unit was calculated from a calibration curve obtained by using a model polymer fabricated beforehand.

Example 1

The present invention was carried out as follows using an apparatus shown in the figure.

[Step (1)]

Nitrogen was introduced to a monomer mixture containing 97.8 mass % of refined methyl methacrylate (MMA) and 2.2 mass % of methyl acrylate (MA), and dissolved oxygen was made to be 0.5 ppm. There was mixed 0.16 parts by mol of n-octyl mercaptan with 100 parts by mol of the monomer mixture. There was further mixed $5.2 \times 10^{-5}$ mol of tert-butylperoxy-3,5,5-trimethyl hexanoate as a first radical polymerization initiator (a) with 1 mol of the monomer mixture to thereby prepare a raw material. The amount of n-octyl mercaptan and the amount of tert-butylperoxy-3,5,5-trimethyl hexanoate in the raw material were 0.23 mass % and 0.012 mass %, respectively.

The raw material was continuously fed to the reactor (A) with a jacket having a cooling coil at a gas phase [volume: 100 L, stirring blade: Double Helical Ribbon] as first reactor 1 at a flow rate of 25 kg/hr, and stirred and mixed in the reactor (A) to thereby polymerize the raw material. The polymerization temperature of the reaction mixture in the reactor (A) was 135° C. and the half-life period of the first radical polymerization initiator (a) at the polymerization temperature was 828 sec. The amount of the reactant of the monomer mixture residing in the reaction area was made to be 45 kg, and the residence time at this time was made to be 1.8 hours to thereby obtain the first syrup.

[Step (2)-First Stage] Mixer B-1

Then, the first syrup was continuously extracted from first reactor 1 at a flow rate of 25 kg/hr, and fed to a plug flow mixer B-1 as initiator-mixing mixer 3 (manufactured by Sumitomo Heavy Industries, Ltd., piping internally installed with an SMX Sulzer Mixer, trade name: SMX-type Sulzer Mixer) with gear pump 2. At this time, mixer 3 had an inner diameter D of φ27.2 mm and an L/D of 16. The residence time of the syrup in mixer 3 at this time was 36 sec.

The jacket of mixer 3 was heated to 150° C. by heat medium heating; and a regulating liquid in which tert-butylperoxy-3,5,5-trimethyl hexanoate as the second radical polymerization initiator (c)-1 was dilution regulated with MMA so that the concentration became 1 mass % was added to the inlet port at a flow rate by which the concentration of the second radical polymerization initiator (c)-1 became $0.86 \times 10^{-5}$ mol (0.002 mass %). At this time, the half-life period of the second radical polymerization initiator (c)-1 at the wall surface temperature of mixer 3 was 224 sec.

The temperature (x1) of the first syrup at the inlet port of mixer 3 was 136° C.; the temperature (y1) of the syrup mixture at the outlet port thereof was 145° C.; at this time, the temperature difference ΔT between the inlet port and the outlet port of mixer 3 was 9° C.; and the residual ratio of the second radical polymerization initiator (c)-1 at the outlet port was 93%.

[Step (2)-First Stage] Reactor C-1

The syrup mixture obtained in Step (2)-first stage was successively fed to a plug flow reactor C-1 as second reactor 4 (manufactured by Noritake Co., Ltd., a tube reactor internally installed with a static mixer, trade name: Static Mixer); and the residence time was made to be 20 min for the polymerization.

The jacket of second reactor 4 was heated to 150° C. by heat medium heating; and the half-life period at the wall surface temperature was 224 sec.

[Step (2)-Second Stage] Mixer B-2

A syrup mixture was successively obtained as in Step (2)-first stage, except for making the temperature of initiator-mixing mixer 5 (B-2, having the same specification as initiator-mixing mixer 3) to be 180° C., and adding di-tert-butyl peroxide as the second radical polymerization initiator (c)-2 at a flow rate by which the concentration became $1.35 \times 10^{-5}$ mol (0.002 mass %), as Step (2)-second stage in order to further raise the polymerization ratio. At this time, the half-life period of the second radical polymerization initiator (c)-2 at the wall surface temperature of mixer 5 was 102 sec.

The temperature (x2) of the syrup mixture at the inlet port of mixer 5 was 158° C.; the temperature (y2) of the syrup mixture at the outlet port thereof was 167° C.; at this time, the temperature difference ΔT between the inlet port and the outlet port of mixer 5 was 9° C.; and the residual ratio of the second radical polymerization initiator (c)-2 at the outlet port was 93.1%.

[Step (2)-Second Stage] Reactor C-2

A syrup mixture obtained in Step (2)-second stage was successively fed to a reactor (C) as third reactor 6 (C-2, having the same specification as second reactor 4); and the residence time was made to be 20 min for the polymerization.

The jacket of third reactor 6 was heated to 180° C. by heat medium heating; and the half-life period at the wall surface temperature was 102 sec.

[Step (3)]

The second syrup obtained in third reactor 6 was successively fed to devolatilization extruder 7 (a vent extruder) at 200° C., and volatile containing unreacted monomers as a main component was separated and removed at 270° C. to thereby obtain a methacrylic-based polymer.

A raw material composition and each step condition in the present Example are shown in Tables 1 to 3.

The first syrup obtained in Step (1) was passed through Step (2) wherein the second radical polymerization initiators (c)-1 and (c)-2 were not fed in Steps (2)-first stage and -second stage, respectively; and volatile was separated and removed in Step (3); and the polymer content φ (1) of Step (1) was determined and was 49 mass %.

After the check of the polymer content φ of Step (1), the second radical polymerization initiators (c)-1 and (c)-2 started to be fed and the first syrup was passed through Step (2) while being reacted; and volatile was separated and removed in Step (3); and the polymer content φ (2) of Step (2) was determined and was 69 mass %.

The proportion (b) of the methyl acrylate unit in the obtained methacrylic-based polymer was 2 mass %. It was thereby confirmed that the number of moles (a) of the first radical polymerization initiator based on 1 mol of the monomer mixture was in the range of the formula (1), and the number of moles (c) of the second radical polymerization initiator based on 1 mol of the monomer mixture was in the range of the formula (2). The amount of the residual monomer was 0.18 mass %, and the amount of the residual dimer was 0.12 mass %.

The obtained methacrylic-based polymer exhibited excellent pyrolysis resistance. The production quantity in the present Example was 383 kg/hr/m$^3$, which exhibited a high productivity. The continuous operation of 120 hours posed no problem in control of the polymerization, and there were also not observed deposits on the apparatus, formation of foreign matter and the like in the observation of the reactor tank interior after the finish of the operation. The evaluation results of the methacrylic-based polymer obtained in the present Example are shown in Table 4.

Examples 2 to 9

Methacrylic-based polymers having physical properties shown in Table 4 were obtained as in Example 1, except for using raw material compositions and conditions of each Step shown in Tables 1 to 3. Here, Example 6 was carried out with only one stage for Step (2). For all the Examples 2 to 9, it was confirmed that the number of moles (a) of the first radical polymerization initiator and the number of moles (c) of the second radical polymerization initiator based on 1 mol of the monomer mixture were in the range of the formulas (1) and (2). In all the Examples 2 to 9, the continuous operation of 120 hours posed no problem in control of the polymerization, and there were also not observed deposits on the apparatus, formation of foreign matter and the like in the observation of the reactor tank interior after the finish of the operation.

Comparative Examples 1 to 3

Methacrylic-based polymers having physical properties shown in Table 4 were obtained as in Example 1, except for using raw material compositions and polymerization conditions shown in Tables 1 to 3. For all the Comparative Examples 1 to 3, it was confirmed that the number of moles (a) of the first radical polymerization initiator based on 1 mol of the monomer mixture was below the range of the formula (1). Although excellent pyrolysis resistance can be obtained in such conditions, the production quantity decreased as compared to Examples.

Comparative Examples 4 to 6

Methacrylic-based polymers having physical properties shown in Table 4 were obtained as in Example 1, except for using raw material compositions and polymerization conditions shown in Tables 1 to 3. For all the Comparative Examples 4 to 6, it was confirmed that the number of moles (a) of the first radical polymerization initiator based on 1 mol of the monomer mixture was above the range of the formula (1). Although an excellent production quantity can be obtained in such conditions, the pyrolysis resistance of shaped article decreased as compared to Examples.

As a result of comparisons of Examples 1 to 9 with Comparative Examples 1 to 6, it was confirmed that in the range of the formula (1), the productivity can be largely improved without extremely restricting the temperature width for molding.

It was also confirmed that in the range of the formula (3), the decrease in the pyrolysis resistance in the case where the amount of a radical polymerization initiator used is increased is moderate, and the productivity can be improved in the state of a high quality being maintained.

Examples 10 and 11

Methacrylic-based polymers having physical properties shown in Table 4 were obtained as in Example 1, except for using raw material compositions and conditions of each Step shown in Tables 1 to 3. In either of Examples 10 and 11, it was confirmed that the number of moles (a) of the first radical polymerization initiator and the number of moles (c) of the second radical polymerization initiator based on 1 mol of the monomer mixture were in the range of the formulas (1) and (2), respectively. In either of Examples 10 and 11, the continuous operation of 120 hours posed no problem in control of the polymerization, and there were also not observed deposits on the apparatus, formation of foreign matter and the like in the observation of the reactor tank interior after the finish of the operation.

Comparative Examples 7 and 8

Methacrylic-based polymers having physical properties shown in Table 4 were obtained as in Example 1, except for using raw material compositions and conditions of each Step shown in Tables 1 to 3. In either of Comparative Examples 7 and 8, it was confirmed that although the number of moles (a) of the first radical polymerization initiator based on 1 mol of the monomer mixture was in the range of the formula (1), the number of moles (c) of the second radical polymerization initiator based on 1 mol of the monomer mixture was above the range of the formula (2). Although the polymerization ratio is increased and an excellent production quantity can be obtained in such conditions, the pyrolysis resistance decreased as compared to Examples.

As a result of comparisons of Examples 10 and 11 with Comparative Examples 7 and 8, it was confirmed that in the range of the formula (2), the productivity can be further improved by raising the polymerization ratio without extremely restricting the temperature width for shaping.

Comparative Example 9

Comparative Example 9 was carried out as in Example 1, except for using a raw material composition and conditions of each Step shown in Tables 1 to 3. The half-life period in Step (2)-first stage was 1,962 sec, which was above 1,000 sec. As a result, in initiator-mixing mixer 3, the polymerization gradually proceeded from the vicinity of the wall surface where the flow velocity was slow, resulting in finally clogging mixer 3 and making the long-term operation impossible.

Examples 12 to 15

Raw material compositions and conditions of each Step shown in Table 1 to 3 were used. Initiator-mixing mixers 3 and 5 having an inner diameter of ϕ21.4 mm and an effective length/diameter ratio (L/D) of 16 were used. Methacrylic-based polymers having physical properties shown in Table 4 were obtained as in Example 1, except for these conditions. In any of Examples 12 to 15, it was confirmed that the number of moles (a) of the first radical polymerization initiator and the number of moles (c) of the second radical polymerization initiator based on 1 mol of the monomer mixture were in the range of the formulas (1) and (2), respectively. In any of Examples 12 to 15, the continuous operation of 120 hours posed no problem in control of the polymerization, and there were also not observed deposits on the apparatus, formation of foreign matter and the like in the observation of the reactor tank interior after the finish of the operation.

In Examples 12 to 15, by downsizing the initiator-mixing mixer and reducing the residence time, also the residual ratio of the radical polymerization initiator (c) at the outlet port of the initiator-mixing mixer was improved. The mixer outlet port temperature decreased, and ΔT became 5° C. or lower.

Examples 12 and 13 in comparison with Examples 10 and 11 gave a result, as described above, that by mixing the syrup and the second radical polymerization initiator (c) in the range, the initiator was efficiently consumed in the polymerization in Step (2), and a higher polymerization ratio was acquired in the same amount of the initiator. Examples 12 and 13 gave also a result that due to the decrease in the load in the devolatilization extruder and the decrease of unreacted MMA to cause formation of dimer, along with the rise of the polymerization ratio, also residual volatile contained in the polymer largely decreased.

In Examples 14 and 15 in comparison with Examples 1 and 6, the pyrolysis resistance could be maintained in a high level and the production quantity could be further expanded.

TABLE 1

| No. | Composition MMA [mass %] | MA [mass %] | Radical Polymerization Initiator (a) [mol/1 – mol of monomer] | Chain Transfer Agent [mol/1 – mol of monomer] | Step (1) Polymerization Condition by Reactor (A) Polymerization Temperature [° C.] | Residence Time [hr] | Half-Life Period [sec] |
|---|---|---|---|---|---|---|---|
| Example 1 | 97.8 | 2.2 | (i) $5.2 \times 10^{-5}$ (0.012 mass %) | 0.16 (0.23 mass %) | 135 | 1.8 | 829 |
| Example 2 | 93 | 7 | (i) $5.2 \times 10^{-5}$ (0.012 mass %) | 0.21 (0.3 mass %) | 135 | 1.8 | 829 |
| Example 3 | 83 | 17 | (i) $5.1 \times 10^{-5}$ (0.012 mass %) | 0.15 (0.22 mass %) | 135 | 1.8 | 829 |
| Example 4 | 93 | 7 | (i) $6.0 \times 10^{-5}$ (0.014 mass %) | 0.21 (0.3 mass %) | 135 | 1.4 | 829 |
| Example 5 | 83 | 17 | (i) $6.8 \times 10^{-5}$ (0.016 mass %) | 0.15 (0.22 mass %) | 135 | 1.2 | 829 |
| Example 6 | 83 | 17 | (i) $7.2 \times 10^{-5}$ (0.017 mass %) | 0.15 (0.22 mass %) | 150 | 1 | 223 |
| Example 7 | 97.8 | 2.2 | (i) $6.1 \times 10^{-5}$ (0.014 mass %) | 0.16 (0.23 mass %) | 135 | 1.5 | 829 |
| Example 8 | 93 | 7 | (i) $6.9 \times 10^{-5}$ (0.016 mass %) | 0.21 (0.3 mass %) | 135 | 1.2 | 829 |
| Example 9 | 83 | 17 | (i) $8.0 \times 10^{-5}$ (0.019 mass %) | 0.15 (0.22 mass %) | 135 | 0.9 | 829 |
| Example 10 | 97.8 | 2.2 | (i) $6.1 \times 10^{-5}$ (0.014 mass %) | 0.16 (0.23 mass %) | 135 | 1.5 | 829 |
| Example 11 | 83 | 17 | (i) $8.0 \times 10^{-5}$ (0.019 mass %) | 0.15 (0.22 mass %) | 135 | 0.9 | 829 |
| Example 12 | 97.8 | 2.2 | (i) $6.1 \times 10^{-5}$ (0.014 mass %) | 0.16 (0.23 mass %) | 135 | 1.5 | 829 |
| Example 13 | 83 | 17 | (i) $8.0 \times 10^{-5}$ (0.019 mass %) | 0.15 (0.22 mass %) | 135 | 0.9 | 829 |
| Example 14 | 97.8 | 2.2 | (i) $5.2 \times 10^{-5}$ (0.012 mass %) | 0.16 (0.23 mass %) | 135 | 1.8 | 829 |
| Example 15 | 83 | 17 | (i) $6.8 \times 10^{-5}$ (0.016 mass %) | 0.15 (0.22 mass %) | 135 | 1.2 | 829 |
| Comparative Example 1 | 97.8 | 2.2 | (i) $4.3 \times 10^{-5}$ (0.01 mass %) | 0.16 (0.23 mass %) | 135 | 2.2 | 829 |
| Comparative Example 2 | 93 | 7 | (i) $4.5 \times 10^{-5}$ (0.0105 mass %) | 0.21 (0.3 mass %) | 135 | 2.2 | 829 |
| Comparative Example 3 | 83 | 17 | (i) $4.6 \times 10^{-5}$ (0.011 mass %) | 0.15 (0.22 mass %) | 135 | 2.2 | 829 |
| Comparative Example 4 | 97.8 | 2.2 | (i) $6.7 \times 10^{-5}$ (0.0155 mass %) | 0.16 (0.23 mass %) | 135 | 1.2 | 829 |
| Comparative Example 5 | 93 | 7 | (i) $7.7 \times 10^{-5}$ (0.018 mass %) | 0.21 (0.3 mass %) | 135 | 1 | 829 |
| Comparative Example 6 | 83 | 17 | (i) $9.1 \times 10^{-5}$ (0.0215 mass %) | 0.15 (0.22 mass %) | 135 | 0.75 | 829 |
| Comparative Example 7 | 97.8 | 2.2 | (i) $6.1 \times 10^{-5}$ (0.014 mass %) | 0.16 (0.23 mass %) | 135 | 1.5 | 829 |
| Comparative Example 8 | 83 | 17 | (i) $8.0 \times 10^{-5}$ (0.019 mass %) | 0.15 (0.22 mass %) | 135 | 0.9 | 829 |
| Comparative Example 9 | 97.8 | 2.2 | (i) $6.1 \times 10^{-5}$ (0.014 mass %) | 0.16 (0.23 mass %) | 135 | 1.5 | 829 |

TABLE 2

| No. | (c)-1 Radical Polymerization Initiator [mol/1 − mol of monomer] | Mixer (B) Jacket Temperature [° C.] | Half-Life Period [sec] | Residence Time [sec] | (x1) Inlet Port Temperature [° C.] | (y1) Outlet Port Temperature [° C.] | (y1) − (x1) ΔT [° C.] | Initiator Residual Ratio [%] | Reactor (C) Jacket Temperature [° C.] | Half-Life Period [sec] | Residence Time [min] |
|---|---|---|---|---|---|---|---|---|---|---|---|
| | | Step (2)-1 Condition of Mixer (B) | | | | | | | Step (2)-1 Condition of Reactor (C) | | |
| Example 1 | (i) 0.86 × 10$^{-5}$ (0.002 mass %) | 150 | 224 | 36 | 136 | 145 | 9 | 93 | 150 | 224 | 20 |
| Example 2 | (i) 0.86 × 10$^{-5}$ (0.002 mass %) | 150 | 224 | 36 | 136 | 145 | 9 | 93 | 150 | 224 | 20 |
| Example 3 | (i) 0.86 × 10$^{-5}$ (0.002 mass %) | 150 | 224 | 36 | 136 | 145 | 9 | 93 | 150 | 224 | 20 |
| Example 4 | (i) 0.86 × 10$^{-5}$ (0.002 mass %) | 150 | 224 | 36 | 136 | 145 | 9 | 93 | 150 | 224 | 20 |
| Example 5 | (i) 0.86 × 10$^{-5}$ (0.002 mass %) | 150 | 224 | 36 | 136 | 145 | 9 | 93 | 150 | 224 | 20 |
| Example 6 | (ii) 1.35 × 10$^{-5}$ (0.004 mass %) | 180 | 102 | 36 | 152 | 164 | 12 | 94.8 | 180 | 102 | 20 |
| Example 7 | (i) 0.86 × 10$^{-5}$ (0.002 mass %) | 150 | 224 | 36 | 136 | 145 | 9 | 93 | 150 | 224 | 20 |
| Example 8 | (i) 0.86 × 10$^{-5}$ (0.002 mass %) | 150 | 224 | 36 | 136 | 145 | 9 | 93 | 150 | 224 | 20 |
| Example 9 | (i) 0.86 × 10$^{-5}$ (0.002 mass %) | 150 | 224 | 36 | 136 | 145 | 9 | 93 | 150 | 224 | 20 |
| Example 10 | (i) 1.73 × 10$^{-5}$ (0.004 mass %) | 150 | 224 | 36 | 136 | 145.5 | 9.5 | 92.7 | 150 | 224 | 20 |
| Example 11 | (i) 3.18 × 10$^{-5}$ (0.0075 mass %) | 150 | 224 | 36 | 136 | 146 | 10 | 92.4 | 150 | 224 | 20 |
| Example 12 | (i) 1.73 × 10$^{-5}$ (0.004 mass %) | 150 | 224 | 18 | 136 | 139 | 3 | 97.9 | 150 | 224 | 20 |
| Example 13 | (i) 3.18 × 10$^{-5}$ (0.0075 mass %) | 150 | 224 | 18 | 136 | 140 | 4 | 97.7 | 150 | 224 | 20 |
| Example 14 | (i) 1.73 × 10$^{-5}$ (0.004 mass %) | 150 | 224 | 18 | 136 | 139 | 3 | 97.9 | 150 | 224 | 20 |
| Example 15 | (i) 3.18 × 10$^{-5}$ (0.0075 mass %) | 150 | 224 | 18 | 136 | 140 | 4 | 97.7 | 150 | 224 | 20 |
| Comparative Example 1 | (i) 0.86 × 10$^{-5}$ (0.002 mass %) | 150 | 224 | 36 | 136 | 145 | 9 | 93 | 150 | 224 | 20 |
| Comparative Example 2 | (i) 0.86 × 10$^{-5}$ (0.002 mass %) | 150 | 224 | 36 | 136 | 145 | 9 | 93 | 150 | 224 | 20 |
| Comparative Example 3 | (i) 0.86 × 10$^{-5}$ (0.002 mass %) | 150 | 224 | 36 | 136 | 145 | 9 | 93 | 150 | 224 | 20 |
| Comparative Example 4 | (i) 0.86 × 10$^{-5}$ (0.002 mass %) | 150 | 224 | 36 | 136 | 145 | 9 | 93 | 150 | 224 | 20 |
| Comparative Example 5 | (i) 0.86 × 10$^{-5}$ (0.002 mass %) | 150 | 224 | 36 | 136 | 145 | 9 | 93 | 150 | 224 | 20 |
| Comparative Example 6 | (i) 0.86 × 10$^{-5}$ (0.002 mass %) | 150 | 224 | 36 | 136 | 145 | 9 | 93 | 150 | 224 | 20 |
| Comparative Example 7 | (i) 2.6 × 10$^{-5}$ (0.006 mass %) | 150 | 224 | 36 | 136 | 146 | 10 | 92.4 | 150 | 224 | 20 |
| Comparative Example 8 | (i) 4.24 × 10$^{-5}$ (0.01 mass %) | 150 | 224 | 36 | 136 | 147 | 11 | 91.7 | 150 | 224 | 20 |
| Comparative Example 9 | (ii) 1.35 × 10$^{-5}$ (0.002 mass %) | 150 | 1962 | 36 | — | — | — | — | 150 | 1962 | 20 |

TABLE 3

| No. | (c)-2 Radical Polymerization Initiator [mol/1 − mol of monomer] | Mixer (B) Jacket Temperature [° C.] | Half-Life Period [sec] | Residence Time [sec] | (x2) Inlet Port Temperature [° C.] | (y2) Outlet Port Temperature [° C.] | (y2) − (x2) ΔT [° C.] | Initiator Residual Ratio [%] | Reactor (C) Jacket Temperature [° C.] | Half-Life Period [sec] | Residence Time [min] |
|---|---|---|---|---|---|---|---|---|---|---|---|
| | | Step (2)-2 Condition of Mixer (B) | | | | | | | Step (2)-2 Condition of Reactor (C) | | |
| Example 1 | (ii) 1.35 × 10$^{-5}$ (0.002 mass %) | 180 | 102 | 36 | 158 | 167 | 9 | 93.1 | 180 | 102 | 20 |
| Example 2 | (ii) 1.35 × 10$^{-5}$ (0.002 mass %) | 180 | 102 | 36 | 158 | 167 | 9 | 93.1 | 180 | 102 | 20 |
| Example 3 | (ii) 1.35 × 10$^{-5}$ (0.002 mass %) | 180 | 102 | 36 | 158 | 167 | 9 | 93.1 | 180 | 102 | 20 |

TABLE 3-continued

| | Step (2)-2 Condition of Mixer (B) | | | | | | | | Step (2)-2 Condition of Reactor (C) | | |
|---|---|---|---|---|---|---|---|---|---|---|---|
| | (c)-2 Radical | | | | | | | | | | |
| No. | Polymerization Initiator [mol/1 − mol of monomer] | Mixer (B) Jacket Temperature [° C.] | Half-Life Period [sec] | Residence Time [sec] | (x2) Inlet Port Temperature [° C.] | (y2) Outlet Port Temperature [° C.] | (y2) − (x2) ΔT [° C.] | Initiator Residual Ratio [%] | Reactor (C) Jacket Temperature [° C.] | Half-Life Period [sec] | Residence Time [min] |
| Example 4 | (ii) $1.35 \times 10^{-5}$ (0.002 mass %) | 180 | 102 | 36 | 158 | 167 | 9 | 93.1 | 180 | 102 | 20 |
| Example 5 | (ii) $1.35 \times 10^{-5}$ (0.002 mass %) | 180 | 102 | 36 | 158 | 167 | 9 | 93.1 | 180 | 102 | 20 |
| Example 6 | — | — | — | — | — | — | — | — | — | — | — |
| Example 7 | (ii) $1.35 \times 10^{-5}$ (0.002 mass %) | 180 | 102 | 36 | 158 | 167 | 9 | 93.1 | 180 | 102 | 20 |
| Example 8 | (ii) $1.35 \times 10^{-5}$ (0.002 mass %) | 180 | 102 | 36 | 158 | 167 | 9 | 93.1 | 180 | 102 | 20 |
| Example 9 | (ii) $1.35 \times 10^{-5}$ (0.002 mass %) | 180 | 102 | 36 | 158 | 167 | 9 | 93.1 | 180 | 102 | 20 |
| Example 10 | (ii) $2.73 \times 10^{-5}$ (0.004 mass %) | 180 | 102 | 36 | 159 | 169 | 10 | 91.7 | 180 | 102 | 20 |
| Example 11 | (ii) $5.01 \times 10^{-5}$ (0.0075 mass %) | 180 | 102 | 36 | 160 | 170.5 | 10.5 | 90.5 | 180 | 102 | 20 |
| Example 12 | (ii) $2.73 \times 10^{-5}$ (0.004 mass %) | 180 | 102 | 18 | 160 | 163.5 | 3.5 | 97.5 | 180 | 102 | 20 |
| Example 13 | (ii) $5.01 \times 10^{-5}$ (0.0075 mass %) | 180 | 102 | 18 | 161 | 165.5 | 4.5 | 97 | 180 | 102 | 20 |
| Example 14 | (ii) $2.73 \times 10^{-5}$ (0.004 mass %) | 180 | 102 | 18 | 160 | 163.5 | 3.5 | 97.5 | 180 | 102 | 20 |
| Example 15 | (ii) $5.01 \times 10^{-5}$ (0.0075 mass %) | 180 | 102 | 18 | 161 | 165.5 | 4.5 | 97 | 180 | 102 | 20 |
| Comparative Example 1 | (ii) $1.35 \times 10^{-5}$ (0.002 mass %) | 180 | 102 | 36 | 158 | 167 | 9 | 93.1 | 180 | 102 | 20 |
| Comparative Example 2 | (ii) $1.35 \times 10^{-5}$ (0.002 mass %) | 180 | 102 | 36 | 158 | 167 | 9 | 93.1 | 180 | 102 | 20 |
| Comparative Example 3 | (ii) $1.35 \times 10^{-5}$ (0.002 mass %) | 180 | 102 | 36 | 158 | 167 | 9 | 93.1 | 180 | 102 | 20 |
| Comparative Example 4 | (ii) $1.35 \times 10^{-5}$ (0.002 mass %) | 180 | 102 | 36 | 158 | 167 | 9 | 93.1 | 180 | 102 | 20 |
| Comparative Example 5 | (ii) $1.35 \times 10^{-5}$ (0.002 mass %) | 180 | 102 | 36 | 158 | 167 | 9 | 93.1 | 180 | 102 | 20 |
| Comparative Example 6 | (ii) $1.35 \times 10^{-5}$ (0.002 mass %) | 180 | 102 | 36 | 158 | 167 | 9 | 93.1 | 180 | 102 | 20 |
| Comparative Example 7 | (ii) $4.09 \times 10^{-5}$ (0.006 mass %) | 180 | 102 | 36 | 160 | 170 | 10 | 90.9 | 180 | 102 | 20 |
| Comparative Example 8 | (ii) $6.68 \times 10^{-5}$ (0.01 mass %) | 180 | 102 | 36 | 161 | 173.5 | 12.5 | 87.5 | 180 | 102 | 20 |
| Comparative Example 9 | (ii) $1.35 \times 10^{-5}$ (0.002 mass %) | 180 | 102 | 36 | — | — | — | — | 180 | 102 | 20 |

TABLE 4

| No. | β (Amount of MA) [mass %] | Value of Formula (1): 1.75 × β × 10⁻⁶ + 6.0 × 10⁻⁵ Calculated from β | Value of Formula (3): 1.75 × β × 10⁻⁶ + 5.0 × 10⁻⁵ Calculated from β | Value of Formula (2): 0.25 × β × 10⁻⁶ + 5.0 × 10⁻⁵ Calculated from β | φ1 of Step (1) [mass %] | φ2 of Step (2) [mass %] | Amount Residual Monomer [mass %] | Amount of Residual Dimer [mass %] | Productivity [kg/hr/m³] | Pyrolysis Resistance [°C.] | Heat Resistance [°C.] |
|---|---|---|---|---|---|---|---|---|---|---|---|
| Example 1 | 2 | 6.4 × 10⁻⁵ | 5.4 × 10⁻⁵ | 5.5 × 10⁻⁵ | 49 | 69 | 0.18 | 0.12 | 383 | 306 | 104 |
| Example 2 | 6.5 | 7.2 × 10⁻⁵ | 6.2 × 10⁻⁵ | 6.6 × 10⁻⁵ | 50 | 70 | 0.14 | 0.1 | 389 | 308 | 96 |
| Example 3 | 15 | 8.6 × 10⁻⁵ | 7.6 × 10⁻⁵ | 8.8 × 10⁻⁵ | 51 | 71 | 0.12 | 0.07 | 394 | 311 | 86 |
| Example 4 | 6.5 | 7.2 × 10⁻⁵ | 6.2 × 10⁻⁵ | 6.6 × 10⁻⁵ | 49.5 | 69.5 | 0.14 | 0.09 | 496 | 307 | 96 |
| Example 5 | 15 | 8.6 × 10⁻⁵ | 7.6 × 10⁻⁵ | 8.8 × 10⁻⁵ | 50.5 | 70.5 | 0.12 | 0.06 | 588 | 310 | 86 |
| Example 6 | 15.2 | 8.7 × 10⁻⁵ | 7.7 × 10⁻⁵ | 8.8 × 10⁻⁵ | 51.5 | 66 | 0.19 | 1.2 | 660 | 308 | 83.5 |
| Example 7 | 2 | 6.4 × 10⁻⁵ | 5.4 × 10⁻⁵ | 5.5 × 10⁻⁵ | 48.5 | 68.5 | 0.19 | 0.09 | 457 | 302 | 104 |
| Example 8 | 6.5 | 7.2 × 10⁻⁵ | 6.2 × 10⁻⁵ | 6.6 × 10⁻⁵ | 49 | 69 | 0.15 | 0.06 | 575 | 303 | 96 |
| Example 9 | 15 | 8.6 × 10⁻⁵ | 7.6 × 10⁻⁵ | 8.8 × 10⁻⁵ | 50 | 70 | 0.13 | 0.05 | 778 | 304 | 86 |
| Example 10 | 2 | 6.4 × 10⁻⁵ | 5.4 × 10⁻⁵ | 5.5 × 10⁻⁵ | 48.5 | 70 | 0.18 | 0.07 | 467 | 301 | 104 |
| Example 11 | 15.1 | 8.7 × 10⁻⁵ | 7.7 × 10⁻⁵ | 8.8 × 10⁻⁵ | 50 | 73 | 0.11 | 0.04 | 811 | 302.5 | 85 |
| Example 12 | 2.1 | 6.4 × 10⁻⁵ | 5.4 × 10⁻⁵ | 5.5 × 10⁻⁵ | 48.5 | 73.5 | 0.14 | 0.05 | 490 | 301.5 | 103.5 |
| Example 13 | 15.2 | 8.7 × 10⁻⁵ | 7.7 × 10⁻⁵ | 8.8 × 10⁻⁵ | 50 | 77.5 | 0.08 | 0.03 | 861 | 303 | 85 |
| Example 14 | 2.1 | 6.4 × 10⁻⁵ | 5.4 × 10⁻⁵ | 5.5 × 10⁻⁵ | 49 | 74 | 0.12 | 0.07 | 411 | 305 | 103.5 |
| Example 15 | 15.2 | 8.6 × 10⁻⁵ | 7.6 × 10⁻⁵ | 8.8 × 10⁻⁵ | 50.5 | 78 | 0.06 | 0.05 | 650 | 309 | 85 |
| Comparative Example 1 | 2 | 6.4 × 10⁻⁵ | 5.4 × 10⁻⁵ | 5.5 × 10⁻⁵ | 49 | 69 | 0.15 | 0.16 | 314 | 307 | 104 |
| Comparative Example 2 | 6.5 | 7.2 × 10⁻⁵ | 6.2 × 10⁻⁵ | 6.6 × 10⁻⁵ | 50 | 70 | 0.12 | 0.13 | 318 | 309 | 96 |
| Comparative Example 3 | 15 | 8.6 × 10⁻⁵ | 7.6 × 10⁻⁵ | 8.8 × 10⁻⁵ | 51 | 71 | 0.1 | 0.1 | 323 | 311 | 86 |
| Comparative Example 4 | 2 | 6.4 × 10⁻⁵ | 5.4 × 10⁻⁵ | 5.5 × 10⁻⁵ | 47 | 67 | 0.21 | 0.08 | 558 | 296 | 104 |
| Comparative Example 5 | 6.5 | 7.2 × 10⁻⁵ | 6.2 × 10⁻⁵ | 6.6 × 10⁻⁵ | 48 | 68 | 0.17 | 0.05 | 680 | 297 | 96 |
| Comparative Example 6 | 15 | 8.6 × 10⁻⁵ | 7.6 × 10⁻⁵ | 8.8 × 10⁻⁵ | 49 | 69 | 0.14 | 0.04 | 920 | 298 | 86 |
| Comparative Example 7 | 2.1 | 6.4 × 10⁻⁵ | 5.4 × 10⁻⁵ | 5.5 × 10⁻⁵ | 48.5 | 72 | 0.17 | 0.06 | 480 | 296 | 103 |
| Comparative Example 8 | 15.2 | 8.7 × 10⁻⁵ | 7.7 × 10⁻⁵ | 8.8 × 10⁻⁵ | 50 | 76 | 0.1 | 0.04 | 844 | 299 | 84 |
| Comparative Example 9 | — | 6.4 × 10⁻⁵ | 5.4 × 10⁻⁵ | 5.5 × 10⁻⁵ | 48.5 | 69 | | | clogging | | |

Abbreviations in Tables are as follows.
MMA: methyl methacrylate
MA: methyl acrylate
(i): tert-butylperoxy-3,5,5-trimethyl hexanoate
(ii): di-tert-butyl peroxide

REFERENCE SIGNS LIST

1: FIRST REACTOR (COMPLETE MIXING REACTOR)
2: GEAR PUMP
3: INITIATOR-MIXING MIXER (PLUG FLOW MIXER)
4: SECOND REACTOR (PLUG FLOW REACTOR)
5: INITIATOR-MIXING MIXER (PLUG FLOW MIXER)
6: THIRD REACTOR (PLUG FLOW REACTOR)
7: DEVOLATILIZATION EXTRUDER

The invention claimed is:

1. A method for producing a methacrylic-based polymer, comprising the following Steps (1) and (2):
Step (1): using a complete mixing reactor (A) to thereby obtain a first syrup with the step comprising the following steps (1)-1, (1)-2 and (1)-3:
(1)-1: continuously feeding a monomer mixture containing 80 to 99.9 mass % of methyl methacrylate and 0.1 to 20 mass % of an alkyl acrylate, 0.01 to 1.0 parts by mol of a mercaptan based on 100 parts by mol of the monomer mixture, and a first radical polymerization initiator (a) in an amount satisfying the following formula (1), to the complete mixing reactor (A):

$$5.0\times10^{-5} < \alpha \le 1.75\times\beta\times10^{-6} + 6.0\times10^{-5} \quad (1)$$

wherein in the formula (1), $\alpha$ is a number of moles of the first radical polymerization initiator (a) based on 1 mol of the monomer mixture; and $\beta$ is a proportion (mass %) of an alkyl acrylate unit in the methacrylic-based polymer to be produced;
(1)-2: carrying out stirring and mixing at a temperature of the complete mixing reactor (A) interior of 110 to 160° C., and carrying out polymerization so that a content of a polymer of the monomer mixture becomes 40 to 60 mass %; and
(1)-3: continuously obtaining the first syrup from the complete mixing reactor (A);
Step (2): using a reaction apparatus (D) comprising a plug flow mixer (B) and a plug flow reactor (C) to thereby obtain a second syrup, wherein a second radical polymerization initiator (c) is added to the first syrup with the plug flow mixer (B) having an inner wall temperature set at the temperature of the complete mixing reactor (A) interior or higher and 230° C. or lower to thereby make a syrup mixture, and then polymerization is carried out by the plug flow reactor (C) to obtain the second syrup.

2. A method for producing a methacrylic-based polymer, comprising the following Steps (1) to (3):
Step (1): using a complete mixing reactor (A) to thereby obtain a first syrup with the step comprising the following steps (1)-1, (1)-2 and (1)-3:
(1)-1: continuously feeding a monomer mixture containing 80 to 99.9 mass % of methyl methacrylate and 0.1 to 20 mass % of an alkyl acrylate, 0.01 to 1.0 parts by mol of a mercaptan based on 100 parts by mol of the monomer mixture, and a first radical polymerization initiator (a) in an amount satisfying the following formula (1), to the complete mixing reactor (A):

$$5.0\times10^{-5} < \alpha \le 1.75\times\beta\times10^{-6} + 6.0\times10^{-5} \quad (1)$$

wherein in the formula (1), $\alpha$ is a number of moles of the first radical polymerization initiator (a) based on 1 mol of the monomer mixture; and $\beta$ is a proportion (mass %) of an alkyl acrylate unit in the methacrylic-based polymer to be produced;
(1)-2: carrying out stirring and mixing at a temperature of the complete mixing reactor (A) interior of 110 to 160° C., and carrying out polymerization so that a content of a polymer of the monomer mixture becomes 40 to 60 mass %; and
(1)-3: continuously obtaining the first syrup from the complete mixing reactor (A);
Step (2): using a reaction apparatus (D) comprising a plug flow mixer (B) and a plug flow reactor (C) to thereby obtain a second syrup with the step comprising the following steps of (2)-1, (2)-2 and (2)-3:
(2)-1: adding a second radical polymerization initiator (c) satisfying the following conditions (i) to (iii) to the first syrup, and carrying out mixing with the plug flow mixer (B) having an inner wall temperature set at the temperature of the complete mixing reactor (A) interior or higher and 230° C. or lower to thereby make a syrup mixture:
Condition (i): a half-life period of the second radical polymerization initiator (c) at an inner wall temperature of the plug flow mixer (B) is 1,000 sec or shorter;
Condition (ii): a half-life period of the second radical polymerization initiator (c) at an inner wall temperature of the reactor (C) is 1,000 sec or shorter; and
Condition (iii): an amount of the second radical polymerization initiator (c) added satisfies the following formula (2):

$$1.0\times10^{-6} < \gamma \le 0.25\times\beta\times10^{-6} + 5.0\times10^{-5} \quad (2)$$

wherein in the formula (2), $\gamma$ is a number of moles of the second radical polymerization initiator (c) based on 1 mol of the monomer mixture; and $\beta$ is a proportion (mass %) of an alkyl acrylate unit in the methacrylic-based polymer to be produced;
(2)-2: polymerizing the syrup mixture in the plug flow reactor (C) having an inner wall temperature set at the temperature of the complete mixing reactor (A) interior or higher and 230° C. or lower to thereby make a polymerized mixture; and
(2)-3: obtaining the second syrup having a content of a polymer in the polymerized mixture of 50 to 90 mass %; and
Step (3): feeding the second syrup to a volatile-removing apparatus (E), and continuously separating and removing volatile.

3. The method for producing a methacrylic-based polymer according to claim 1, comprising using a reaction apparatus (D) wherein n sets of a plug flow mixer (Bn) and a plug flow reactor (Cn) (n is an integer of 1 or more) are arranged in the order of a plug flow mixer (Bn) and a plug flow reactor (Cn), and adding the second radical polymerization initiator (cn) (n is an integer of 1 or more) in an inlet port of each of the mixers (Bn) and successively carrying out polymerization in each of the reactors (Cn) to thereby obtain the second syrup.

4. The method for producing a methacrylic-based polymer according to claim 1, wherein an amount of the first radical polymerization initiator (a) fed in Step (1) satisfies the following formula (3):

$$5.0\times10^{-5} < \alpha \le 1.75\times\beta\times10^{-6} + 5.0\times10^{-5} \quad (3)$$

wherein in the formula (3), $\alpha$ is a number of moles of the first radical polymerization initiator (a) based on 1 mol of the monomer mixture; and β is a proportion (mass %) of an alkyl acrylate unit in the methacrylic-based polymer to be produced.

5. The method for producing a methacrylic-based polymer according to claim 1,
wherein a residence time of the syrup in the mixer (B) in Step (2) is 1 to 30 sec;
wherein the following formula (4) is satisfied:

$$y < x + 5 \quad (4)$$

wherein x is a syrup temperature (° C.) at an inlet port of the mixer (B), and y is a syrup temperature (° C.) at an outlet port of the mixer (B); and
wherein a residual ratio of the second radical polymerization initiator (c) contained in the syrup at the outlet port of the mixer (B) is 95% or higher.

* * * * *